US007945714B2

(12) United States Patent
Park (10) Patent No.: US 7,945,714 B2
(45) Date of Patent: May 17, 2011

(54) APPARATUS AND METHOD OF TRACING DESCRIPTORS IN HOST CONTROLLER

(75) Inventor: Jung-su Park, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 636 days.

(21) Appl. No.: 11/744,233

(22) Filed: May 4, 2007

(65) Prior Publication Data

US 2008/0168192 A1 Jul. 10, 2008

(30) Foreign Application Priority Data

Jan. 10, 2007 (KR) .................. 10-2007-0003084

(51) Int. Cl.
*G06F 13/28* (2006.01)
*G06F 9/44* (2006.01)

(52) U.S. Cl. .......... 710/27; 710/1; 710/18; 710/19; 710/305; 710/313; 714/25; 714/37; 714/39; 714/43; 717/124; 717/128

(58) Field of Classification Search .......... 710/27
See application file for complete search history.

(56) References Cited

U.S. PATENT DOCUMENTS

| 6,049,842 | A  | * | 4/2000  | Garrett et al. ............... 710/33 |
| 6,349,354 | B1 | * | 2/2002  | Garney ....................... 710/313 |
| 6,470,388 | B1 | * | 10/2002 | Niemi et al. ................. 709/224 |
| 6,480,801 | B2 | * | 11/2002 | Chew .......................... 702/122 |
| 6,829,726 | B1 | * | 12/2004 | Korhonen ..................... 714/25  |
| 7,200,671 | B1 | * | 4/2007  | Lev-Ami et al. ............. 709/232 |
| 7,225,288 | B2 | * | 5/2007  | Schulze et al. .............. 710/313 |
| 7,302,614 | B2 | * | 11/2007 | Goto ............................ 714/43  |
| 7,464,197 | B2 | * | 12/2008 | Ganapathy et al. ........... 710/22  |
| 2003/0065829 | A1 | * | 4/2003  | Rasmussen et al. ............ 710/1  |
| 2003/0065839 | A1 | * | 4/2003  | Howard et al. ............... 710/100 |
| 2003/0225957 | A1 | * | 12/2003 | Hesse et al. ................. 710/313 |
| 2004/0078690 | A1 | * | 4/2004  | Kohashi ....................... 714/38  |
| 2004/0153809 | A1 | * | 8/2004  | Goto ............................ 714/36  |
| 2004/0179228 | A1 | * | 9/2004  | McCluskey et al. .......... 358/1.15 |
| 2006/0149882 | A1 | * | 7/2006  | Yang ........................... 710/305 |
| 2006/0277441 | A1 | * | 12/2006 | Edgar et al. .................. 714/38  |
| 2007/0011386 | A1 | * | 1/2007  | Ng et al. ...................... 710/305 |

OTHER PUBLICATIONS

'Universal Serial Bus Specification' Revision 2.0, Apr. 27, 2000.*
'Encyclopedia > Northbridge (computing)' article posted at http://www.statemaster.com/encyclopedia/Northbridge-(computing), tagged since Nov. 2006.*
'Enhanced Host Controller Interface Specification for Universal Serial Bus' Revision 1.0, Mar. 12, 2002.*
'DMA controller—definition' from WordIQ (found at http://www.wordiq.com/definition/DMA_controller).*
'Channel I/O' from Wikipedia online encyclopedia and archive.org showing publish date of Sep. 13, 2006.*

* cited by examiner

*Primary Examiner* — Henry W Tsai
*Assistant Examiner* — Steven G Snyder
(74) *Attorney, Agent, or Firm* — Sughrue Mion, PLLC (57) ABSTRACT

Apparatus and method of tracing descriptor in a host controller are provided. The host controller for controlling a device includes a first bus interface coupled to a system bus, a processor which determines whether data received from a system memory through the first bus interface are descriptor data, and a descriptor tracer which receives and stores descriptor data transmitted to the processor. Therefore, the host controller provides rapid and various functional checking and debugging.

32 Claims, 6 Drawing Sheets

APPARATUS AND METHOD OF TRACING DESCRIPTORS IN HOST CONTROLLER

CROSS-REFERENCE TO RELATED PATENT APPLICATION

This application claims priority from Korean Patent Application No. 10-2007-0003084, filed on Jan. 10, 2007, in the Korean Intellectual Property Office, the disclosure of which is incorporated herein in its entirety by reference.

BACKGROUND OF THE INVENTION

1. Field of the Invention

Apparatus and methods consistent with the present invention relate to a host controller, and more particularly, to an USB host controller including a descriptor tracing apparatus.

2. Description of the Related Art

Universal serial bus (USB) is a serial bus standard for personal computer (PC) peripheral devices. USB supports plug & play and hot-swap such that re-booting or setup is not required for USB devices. Thus, USB devices can be easily installed and used. Owing to these advantages, USB is widely used for embedded systems as well as PCs.

An USB system includes an USB host and an USB device. Generally, the USB host is installed in a computing module such as a PC and operated as a master controlling overall data communication. The USB device is installed in a unit, which is connected to a host, such as a printer and a mouse for providing a specific function.

Meanwhile, a system-on-chip (SOC) is a semiconductor integrated circuit (IC) chip providing a plurality of functions by one chip. System size and system test time can be reduced, and system reliability can be improved using an SOC.

Various USB devices are currently available on the market. Generally, an USB host controller is included in an SOC formed to connect an USB device to an USB host.

Figure 1:
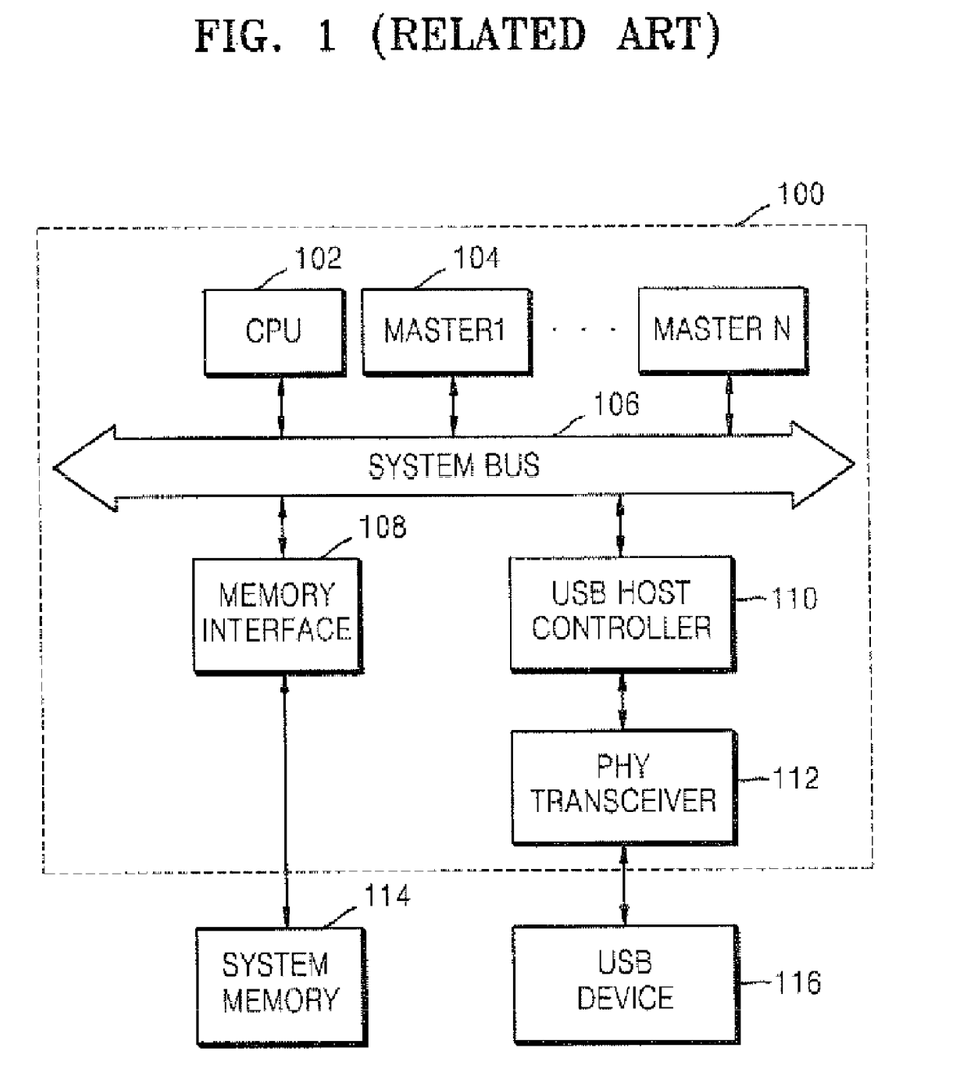
FIG. 1 is a block diagram illustrating a related art SOC with an USB host controller.

FIG. 1 is a block diagram illustrating a related art system on chip with an USB host controller.

Referring to FIG. 1, a central processing unit (CPU) 102 and a plurality of masters 104 share system memory 114 through a system bus 106 and a memory interface 108. An USB host controller 110 is necessary to access the system memory 114 while communicating with an USB device 116.

However, when the USB host controller 110 accesses the system memory 114, one of the masters 104 may be exclusively in use of the system bus 106. In addition, the possibility of a memory error is high due to another complex reason.

Particularly, if an error occurs during the transmission of important descriptor information including device type, manufacturer, supportable USB version, the USB host controller 110 malfunctions, and it is difficult to find the reason of the malfunctioning of the USB host controller 110.

SUMMARY OF THE INVENTION

The present invention provides an apparatus and method of tracing a descriptor in a host controller, allowing the host controller to perform various functional checking and debugging since descriptor data transmitted from a system memory to the host controller may be traced.

According to an aspect of the present invention, there is provided a host controller for controlling a device, including: a first bus interface coupled to a system bus; a processor which determines whether data received from a system memory via the first bus interface are descriptor data; and a descriptor tracer receiving and storing descriptor data transmitted to the processor.

The host controller may be an USB host controller for controlling an USB device.

The descriptor tracer may include: a descriptor access time detector which detects a receiving time at which descriptor data are received by the processor, and which receives the descriptor data at the receiving time; and a memory which stores the descriptor data received by the descriptor access time detector.

The descriptor tracer may further include a second bus interface which allows a CPU to directly access the memory.

The descriptor tracer may further include a flag generator which generates an error flag if the flag generator does not receive a receiving time of descriptor data from the descriptor access time detector for a certain time interval.

The flag generator may transmit the error flag to the CPU.

The flag generator may signal the descriptor access time detector not to send a write request to the memory.

The descriptor access time detector may further include a memory controller so as to control the memory.

The memory may be a dual-port random access memory (RAM).

The memory may have a capacity in a range of 1 Kbytes through 4 Kbytes.

The host controller may further include a start-of-frame (SOF) generator which generates a frame start signal periodically and sends the frame start signal to the processor.

The host controller may further include a register which temporarily stores control data and status data of the host controller.

The host controller may further include a buffer which buffers input/output data of the device.

The host controller may further include a root hub used for connection with the device.

If the processor updates a status of descriptor data, the descriptor access time detector may receive the descriptor data and output the descriptor data and a control signal to store the descriptor data into the memory to the memory controller.

The host controller may be included in a SOC (system-on-chip).

According to another aspect of the present invention, there is provided an apparatus for tracing a descriptor in a host controller controlling a device, the apparatus including: a descriptor access time detector which detects a receiving time of descriptor data and receives the descriptor data at the receiving time; a memory storing the descriptor data received by the descriptor access time detector; a memory controller which controls the memory; a second bus interface which allows a CPU to directly access the memory; and a flag generator which generates an error flag when the flag generator does not receive a receiving time of descriptor data from the descriptor access time detector for a certain time interval.

According to another aspect of the present invention, there is provided a method of tracing a descriptor in a host controller controlling a device, the method including: reading data from a system memory; determining whether the read data are descriptor data; if the read data are descriptor data, detecting a receiving time of the descriptor data; and storing the descriptor data received at the receiving time.

According to another aspect of the present invention, there is provided a computer-readable recording medium having stored thereon a program for executing a method including: reading data from a system memory; determining whether the read data are descriptor data; if the read data are descriptor data, detecting a receiving time of the descriptor data; and storing the descriptor data received at the receiving time.

BRIEF DESCRIPTION OF THE DRAWINGS

The above and other aspects of the present invention will become more apparent by describing in detail exemplary embodiments thereof with reference to the accompanying drawings in which.

DETAILED DESCRIPTION OF THE EXEMPLARY EMBODIMENTS OF THE PRESENT INVENTION

Hereinafter, exemplary embodiments of the present invention will be described in detail with reference to the accompanying drawings.

Figure 2:
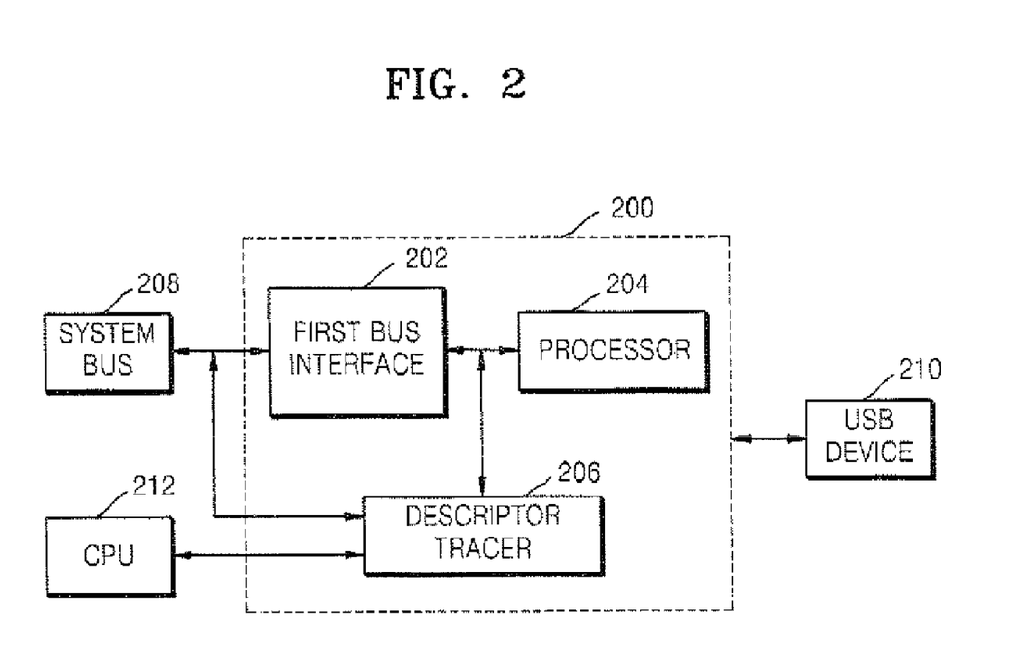
FIG. 2 is a block diagram illustrating an USB host controller according to an exemplary embodiment of the present invention.

FIG. 2 is a block diagram illustrating an USB host controller 200 according to an exemplary embodiment of the present invention.

Referring to FIG. 2, the USB host controller 200 of the current exemplary embodiment includes a first bus interface 202, a processor 204, and a descriptor tracer 206.

The first bus interface 202 is an interface between a system bus 208 and the USB host controller 200. The USB host controller 200 receives data stored in a system memory 114 (refer to FIG. 1) through the system bus 208 and the first bus interface 202. When the USB host controller 200 receives descriptor data, the descriptor data can be transmitted to the descriptor tracer 206 without passing through the first bus interface 202 as described below.

Descriptor data are information necessary for the USB host controller 200 to access an USB device 210. For example, the descriptor data include information about device type, manufacturer, and supportable USB version. Such descriptor data are usually stored in the system memory 114. The system memory 114 is shared by a CPU 102 and a plurality of masters 104 of an SOC (refer to FIG. 1).

The processor 204 is a main controller of the USB host controller 200. The processor 204 processes a list (i.e., a data structure generated using descriptor data during an USB data communication) generated by an USB host controller driver. Furthermore, the processor 204 interfaces with other components of the USB host controller 200.

In addition, the processor 204 determines whether data received from the system memory 114 through the system bus 208 and the first bus interface 202 are descriptor data. If the received data are descriptor data, the processor 204 signals the descriptor tracer 206 to detect the receiving time of the descriptor data and store the descriptor data.

The descriptor tracer 206 is coupled to the system bus 208, the processor 204, and the first bus interface 202. When descriptor data are transmitted to the USB host controller 200, the descriptor tracer 206 detects the receiving time of the descriptor data by receiving a signal transmitted from the processor 204 to inform the descriptor tracer 206 of the reception of the descriptor data.

Therefore, when descriptor data are transmitted from the system memory 114 to the USB host controller 200, the descriptor tracer 206 can store the descriptor data.

Here, the descriptor data can be transmitted from the system bus 208 to the descriptor tracer 206 without passing through the first bus interface 202.

Furthermore, the descriptor tracer 206 can be directly coupled to a CPU 212 without the first bus interface 202 being interposed between the descriptor tracer 206 and the CPU 212. In this case, the CPU 212 can read the descriptor data directly from the descriptor tracer 206 through an interface of the descriptor tracer 206 to trace the descriptor data and determine whether the USB host controller 200 operates normally.

Furthermore, if the processor 204 updates a status of descriptor data, the descriptor tracer 206 can receive and store the updated descriptor data.

Furthermore, the USB host controller 200 can be included in an SOC.

The current exemplary embodiment of the present invention can be applied to other host controllers as well as the USB host controller 200.

Figure 3:
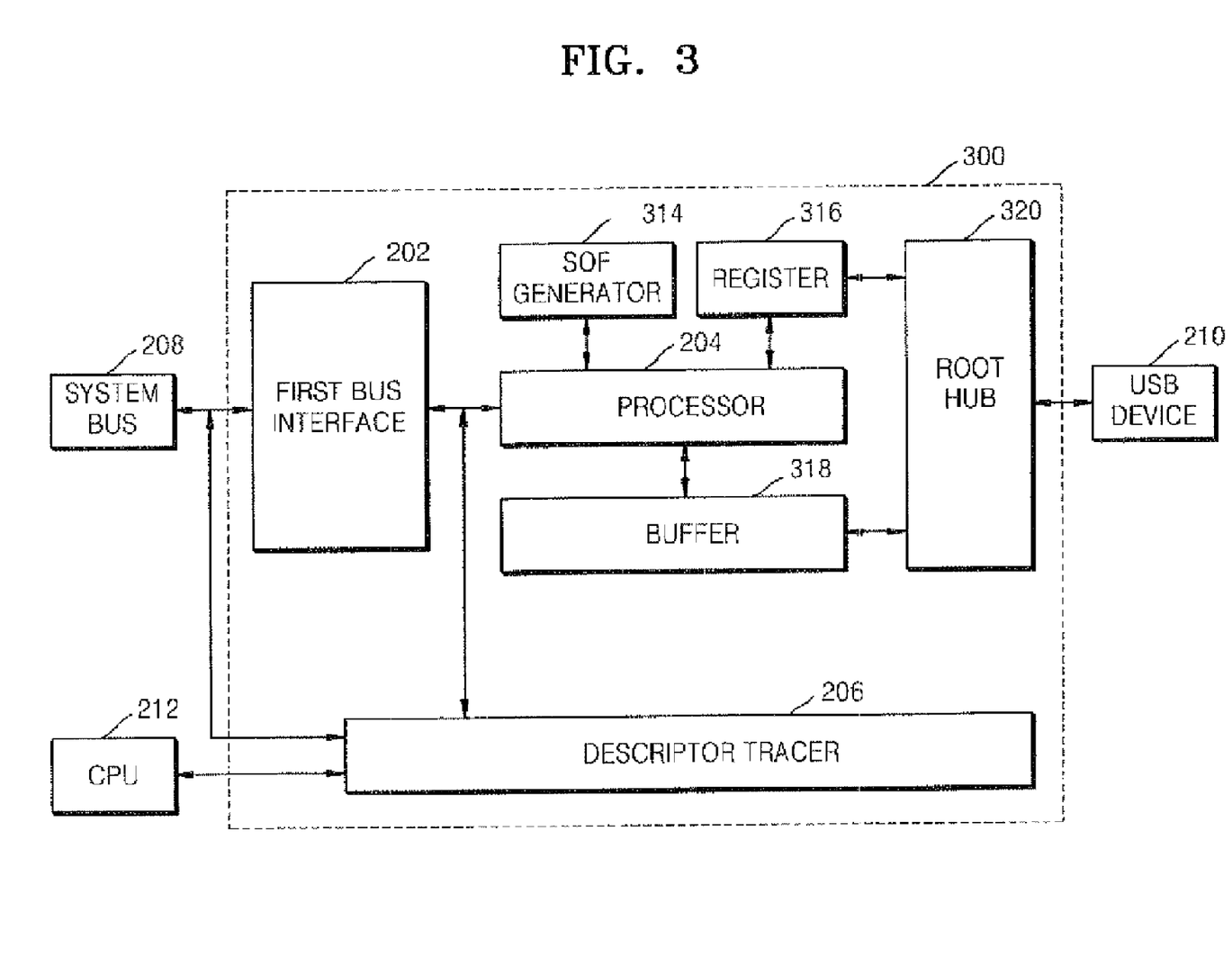
FIG. 3 is a detailed block diagram illustrating an USB host controller according to an exemplary embodiment of the present invention.

FIG. 3 is a detailed block diagram illustrating an USB host controller 300 according to an exemplary embodiment of the present invention.

Referring to FIG. 3, a first bus interface 202, a processor 204, a descriptor tracer 206, a system bus 208, an USB device 210, and a CPU 212 are corresponding to the first bus interface 202, the processor 204, the descriptor tracer 206, the system bus 208, the USB device 210, and the CPU 212 of FIG. 2, respectively.

A start-of-frame (SOF) generator 314 is connected to the processor 204. The SOF generator 314 periodically generates a frame start signal per certain time interval (for example, 1 msec for USB 1.1, 125 μsec for USB 2.0) to provide the signal to the processor 204 for USB data communication.

A register 316 is connected between the processor 204 and a root hub 320 to store temporarily control data and status data for the USB host controller 300.

A buffer 318 is connected between the processor 204 and the root hub 320 for temporarily storing USB in/out transfer data for the USB device 210.

The root hub 320 is coupled to the register 316, the buffer 318, and the USB device 210 for connecting and disconnecting USB downstream ports connected to the USB device 210, generating reset and resume signals. Furthermore, the root hub 320 generates packets toward the USB device 210 according to USB request types and protocol.

Since the first bus interface 202, the processor 204, the descriptor tracer 206, the system bus 208, the USB device 210, and the CPU 212 are described in FIG. 2, descriptions thereof will be omitted.

Figure 4:
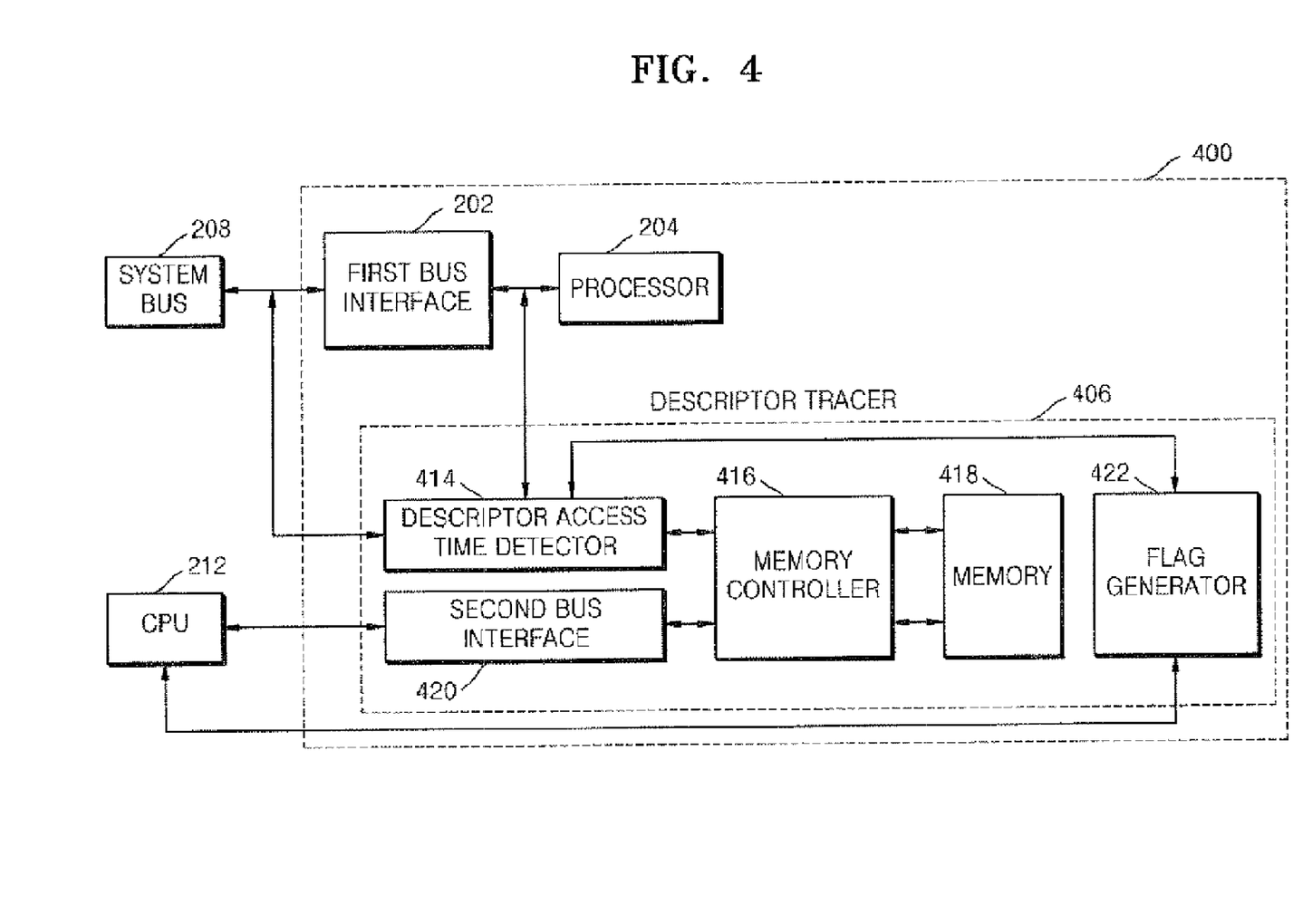
FIG. 4 is a block diagram illustrating a descriptor tracer according to an exemplary embodiment of the present invention.

FIG. 4 is a block diagram illustrating a descriptor tracer according to an embodiment of the present invention.

Referring to FIG. 4, an USB host controller 400 according to an exemplary embodiment of the present invention includes a first bus interface 202, a processor 204, and a descriptor tracer 406.

The first bus interface 202 and the processor 204 correspond to the first bus interface 202 and processor 204 of FIG.

2. Thus, descriptions of the first bus interface 202 and the processor 204 will be omitted.

The descriptor tracer 406 includes a descriptor access time detector 414 and a memory 418.

The descriptor access time detector 414 is connected to a system bus 208, the processor 204, and the first bus interface 202. When descriptor data are transmitted to the USB host controller 400, the descriptor access time detector 414 receives an alarming signal transmitted from the processor 204 to inform the descriptor access time detector 414 of the receiving of the descriptor data and detects the receiving time of the descriptor data by receiving the alarming signal.

After the receiving time of the descriptor data is detected by the descriptor access time detector 414, the descriptor data destined for the USB host controller 400 is directly transmitted to the descriptor access time detector 414 without passing through the first bus interface 202. Then, the descriptor access time detector 414 outputs the descriptor data and a control signal for controlling the memory 418. The control signal is transmitted to a memory controller 416 for requesting the memory 418 to store the descriptor data.

Furthermore, if the processor 204 updates a status of descriptor data, the descriptor access time detector 414 receives the updated descriptor data for storing the updated data into the memory 418.

The memory 418 stores descriptor data which the USB host controller 400 reads or writes through a system memory 114 (refer to FIG. 1). For example, data transmitted to the USB host controller 400 and passed through the descriptor access time detector 414 are stored in the memory 418 as descriptor data.

The memory 418 may be formed of a dual-port RAM for storing descriptor data transmitted to the USB host controller 400 and allowing a CPU 212 to access the memory 418 to read the descriptor data.

However, since the memory 418 affects the total size of an SOC, the capacity of the memory 418 may be optimally selected in consideration of various requirements. For example, the memory 418 may have a capacity in the range of 1 through 4 Kbytes.

According to the current exemplary embodiment, the descriptor tracer 406 may include a memory controller 416 for controlling the memory 418 as shown in FIG. 4.

Furthermore, the descriptor tracer 406 may further include a second interface 420. The second interface 420 is used when the outer CPU 212 directly accesses the memory 418 and reads descriptor data from the memory 418. The CPU 212 can trace descriptor data transmitted from the system memory 114 to the USB host controller 400 using the second interface 420. Therefore, rapid and various functional checking and debugging of the USB host controller 400 can be possible.

The functional checking (or debugging) can be performed in various ways. For example, when descriptor data read from the memory 418 are not consistent with descriptor data sent by the CPU 212, correct descriptor data can be re-transmitted to the USB host controller 400.

The descriptor tracer 406 may further include a flag generator 422. The flag generator 422 is connected to the descriptor access time detector 414 and the CPU 212. The flag generator 422 generates an error flag when the flag generator 422 does not receive receiving time of descriptor data for a certain time interval. Here, the certain time interval can be set by a specification or adjusted by a user.

When the flag generator 422 generates an error flag, the flag generator 422 also generates a control signal to stop a write request from the descriptor access time detector 414 to the memory 418, so that no more descriptor data are stored into the memory 418 through the descriptor access time detector 414. When the descriptor access time detector 414 receives the control signal from the flag generator 422, the descriptor access time detector 414 does not request the memory 418 to store descriptor data transmitted from the system bus 208 until another command is received.

Meanwhile, the error flag generated from the flag generator 422 is transmitted to the CPU 212. Then, the CPU 212 determines whether there is a descriptor data transmission error.

According to another exemplary embodiment of the present invention, there is provided an apparatus for tracing descriptor data including a descriptor access time detector 414, a memory 418, a memory controller 416, a second interface 420, and a flag generator 422. Since the elements of the apparatus are already described, descriptions of thereof will be omitted.

Figure 5:
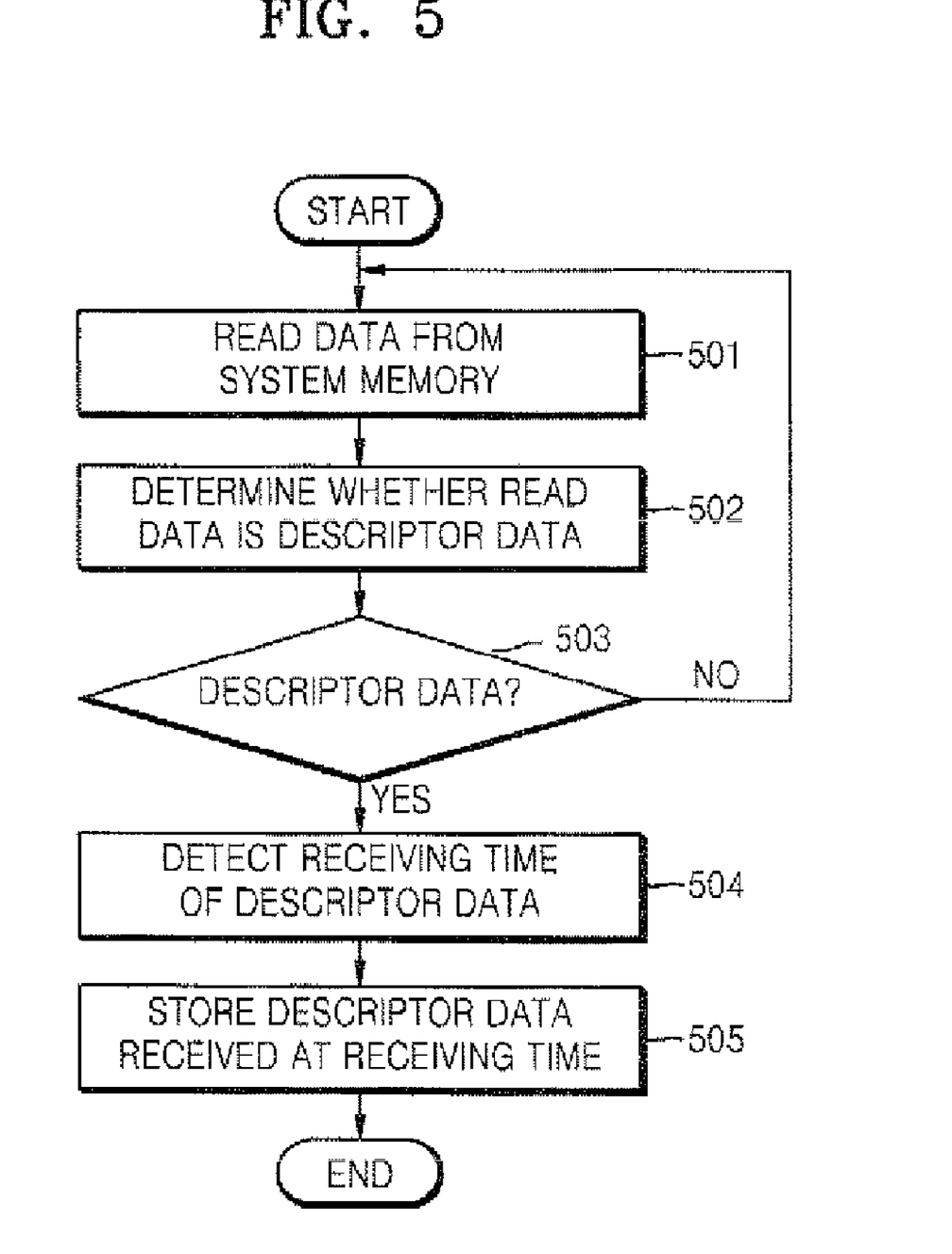
FIG. 5 is a flowchart of a method of tracing a descriptor in an USB host controller according to an exemplary embodiment of the present invention.

FIG. 5 is a flowchart of a method of tracing a descriptor in an USB host controller according to an exemplary embodiment of the present invention.

Referring to FIG. 5, the USB host controller 200 reads data from the system memory 114 in operation 501. Here, the USB host controller 200 reads the data stored in the system memory 114 through the system bus 208 and the first bus interface 202. Generally, descriptor data are stored in the system memory 114.

In operation 502, it is determined whether the read data are descriptor data. For example, the processor 204 determines whether the read data are descriptor data.

If it is determined that the read data are descriptor data in operation 503, a receiving time of the descriptor data is detected in operation 504. For example, the descriptor tracer 206 receives an alarming signal transmitted from the processor 204 to inform the descriptor tracer 206 that descriptor data are transmitted to the USB host controller 200 and detects the receiving time of the descriptor data using the received alarming signal.

In operation 505, the descriptor data received at the receiving time are stored. For example, a dual-port RAM can be used to store descriptor data read or recorded using the system memory 114. In this way, descriptor data input to the USB host controller 200 can be stored, and at the same time the CPU 212 can read the descriptor data.

Since a memory affects the total size of an SOC, the capacity of the memory may be optimally selected in consideration of various requirements. For example, a memory having a capacity in the range of 1 through 4 Kbytes can be used.

Figure 6:
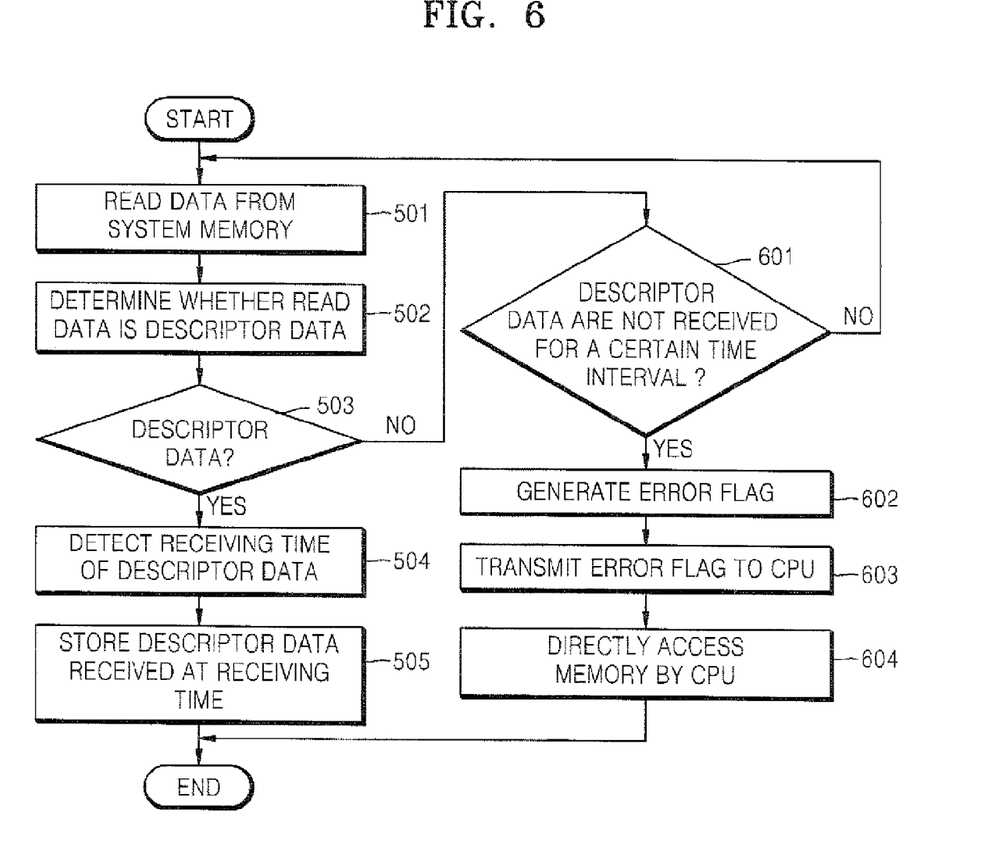
FIG. 6 is a flowchart of a method of tracing a descriptor in an USB host controller according to another exemplary embodiment of the present invention.

FIG. 6 is a flowchart of a method of tracing a descriptor in an USB host controller according to another exemplary embodiment of the present invention.

Referring to FIG. 6, operations 501 through 505 correspond to those explained in the exemplary embodiment of FIG. 5. Thus, descriptions of operations 501 through 505 will be omitted.

If it is determined that the read data are not descriptor data in operation 503, it is determined whether descriptor data are received from the system memory 114 for a certain time interval in operation 601. If descriptor data are not received from the system memory 114 for a certain time interval, an error flag is generated in operation 602. Here, the certain time interval can be set by a specification or adjusted by a user. In addition, when the error flag is generated, a write request can be interrupted so that no more descriptor data can be stored into a memory.

In operation 603, the error flag is sent to the CPU 212. In operation 604, the CPU 212 directly accesses the memory used for storing descriptor data. Therefore, the CPU 212 can determine whether there is a descriptor data transmission error.

As described above, according to the apparatus and method of tracing a descriptor in a host controller of the present invention, the host controller can perform various functional checking and debugging since descriptor data transmitted from a system memory to the host controller can be traced.

The exemplary embodiments of the invention can also be embodied as computer-readable codes on a computer-readable recording medium. The computer-readable recording medium is any data storage device that can store data which can be thereafter read by a computer system.

Examples of the computer-readable recording medium include read-only memory (ROM), random-access memory (RAM), CD-ROMs, magnetic tapes, floppy disks, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A host controller for controlling a device connected to a host, comprising:
    a first bus interface coupled to a system bus;
    a processor which determines whether data received from a system memory via the first bus interface are descriptor data; and
    a descriptor tracer which receives and stores the descriptor data transmitted to the processor,
    wherein the host comprises the system bus and the system memory,
    wherein the descriptor tracer comprises:
        a memory which stores the descriptor data; and
        a second bus interface which allows a central processing unit (CPU) to directly access the memory without passing through the system bus so that the CPU can determine whether the host controller operates normally,
    wherein the descriptor data is directly transmitted to the descriptor tracer from the system bus without passing through the first bus interface.

2. The host controller of claim 1, wherein the host controller is an Universal Serial Bus (USB) host controller for controlling an USB device.

3. The host controller of claim 2, wherein the descriptor tracer further comprises:
    a descriptor access time detector which detects a receiving time at which the descriptor data are received by the processor and receives the descriptor data at the receiving time; wherein the memory stores the descriptor data received by the descriptor access time detector.

4. The host controller of claim 3, wherein the descriptor tracer further comprises a flag generator which generates an error flag if the flag generator does not receive the receiving time of the descriptor data from the descriptor access time detector for a certain time interval.

5. The host controller of claim 4, wherein the flag generator transmits the error flag to the CPU.

6. The host controller of claim 4, wherein the flag generator signals the descriptor access time detector not to send a write request to the memory.

7. The host controller of claim 3, wherein the descriptor access time detector further comprises a memory controller which controls the memory.

8. The host controller of claim 3, wherein the memory is a dual-port random access memory (RAM).

9. The host controller of claim 3, wherein the memory has a capacity in a range of 1 Kbytes through 4 Kbytes.

10. The host controller of claim 2, further comprising an start-of-frame (SOF) generator which generates a frame start signal periodically and sends the frame start signal to the processor.

11. The host controller of claim 2, further comprising a register which temporarily stores control data and status data of the host controller.

12. The host controller of claim 2, further comprising a buffer which buffers input or output data of the device.

13. The host controller of claim 2, further comprising a root hub used for connection with the device.

14. The host controller of claim 7, wherein if the processor updates a status of descriptor data, the descriptor access time detector receives the descriptor data and outputs the descriptor data and a control signal to store the descriptor data into the memory to the memory controller.

15. The host controller of claim 2, wherein the host controller is included in a system-on-chip (SOC).

16. An apparatus for tracing a descriptor in a host controller controlling a device, the apparatus comprising:
    a descriptor access time detector which detects a receiving time of descriptor data via a first bus interface coupled to a system bus and receives the descriptor data at the receiving time;
    a memory which stores the descriptor data received by the descriptor access time detector;
    a memory controller which controls the memory;
    a second bus interface which allows a central processing unit (CPU) to directly access the memory without passing through the system bus so that the CPU can determine whether the host controller operates normally; and
    a flag generator which generates an error flag when the flag generator does not receive the receiving time of the descriptor data from the descriptor access time detector for a certain time interval,
    wherein the descriptor data is directly transmitted to the descriptor access time detector from the system bus without passing through the first bus interface coupled to the system bus.

17. The apparatus of claim 16, wherein the host controller is an Universal Serial Bus (USB) host controller for controlling an USB device.

18. The apparatus of claim 17, wherein the memory is a dual-port random access memory (RAM).

19. The apparatus of claim 18, wherein the memory supports dual accessing so that writing and reading of the descriptor data can be simultaneously performed using the memory.

20. The apparatus of claim 16, wherein if the processor updates a status of descriptor data, the descriptor access time detector receives the descriptor data and outputs the descriptor data and a control signal to store the descriptor data into the memory to the memory controller.

21. A method of tracing a descriptor in a host controller controlling a device to a host, the method comprising:
    reading data from a system memory via a first bus interface coupled to a system bus;
    determining whether the read data are descriptor data;
    detecting a receiving time of the descriptor data, if the read data are descriptor data;
    storing the descriptor data received at the receiving time in a memory by a descriptor tracer, and allowing a central processing unit (CPU) to directly access the memory without passing through the system bus so that the CPU can determine whether the host controller operates normally, wherein the host comprises the system memory, wherein the descriptor data is directly transmitted to the descriptor tracer from the system bus without passing through the first bus interface.

22. The method of claim 21, wherein the host controller is an USB host controller for controlling an Universal Serial Bus (USB) device.

23. The method of claim 21, further comprising generating an error flag when the receiving time of the descriptor data are not received from the system memory for a certain time interval.

24. The method of claim 23, further comprising transmitting the error flag to the central processing unit (CPU).

25. The method of claim 24, further comprising accessing a memory used for storing the descriptor data by the CPU.

26. The method of claim 21, wherein the storing of the descriptor data is performed by storing the descriptor data into a dual-port random access memory (RAM).

27. A non-transitory computer-readable recording medium having stored thereon a program for executing a method of tracing a descriptor in a host controller controlling a device connected to a host, the method comprising:

reading data from a system memory via a first bus interface coupled to a system bus;

determining whether the read data are descriptor data;

detecting a receiving time of the descriptor data, if the read data are descriptor data; and storing the descriptor data received at the receiving time in a memory by a descriptor tracer, and using a central processing unit (CPU) to directly access the memory without passing through the system bus so that the CPU can determine whether the host controller operates normally, wherein the host comprises the system memory, wherein the descriptor data is directly transmitted to the descriptor tracer from the system bus without passing through the first bus interface.

28. A system on chip (SOC) comprising a host controller wherein the host controller for controlling a device comprises:

a first bus interface coupled to a system bus;

a processor which determines whether data received from a system memory via the first bus interface are descriptor data; and a descriptor tracer receiving and storing the descriptor data transmitted to the processor, wherein the host comprises the system bus and the system memory, wherein the descriptor tracer comprises:

a memory which stores the descriptor data; and a second bus interface which allows a central processing unit (CPU) to directly access the memory without passing through the system bus so that the CPU can determine whether the host controller operates normally, wherein the descriptor data is directly transmitted to the descriptor tracer from the system bus without passing through the first bus interface.

29. The host controller of claim 1, wherein the descriptor data comprise at least one of device type information, manufacturer information and version information.

30. The host controller of claim 1, wherein the system memory is shared by the Central Processing Unit (CPU) and a plurality of masters.

31. The apparatus of claim 16, wherein the flag generator is directly connected to the CPU.

32. The apparatus of claim 16, wherein the CPU is external to the host controller.

* * * * *